(12) United States Patent
Clemm et al.

(10) Patent No.: US 12,483,489 B2
(45) Date of Patent: Nov. 25, 2025

(54) NETWORK EMBEDDED FRAMEWORK FOR DISTRIBUTED NETWORK ANALYTICS

(71) Applicant: Cisco Technology, Inc., San Jose, CA (US)

(72) Inventors: Ludwig Alexander Clemm, Los Gatos, CA (US); Yegnanarayanan Chandramouli, Bangalore (IN); Saileshwar Krishnamurthy, Palo Alto, CA (US); Shashidhar Srinivasa, Bangalore (IN); Wojciech Dec, Amsterdam (NL); Ashwin Pankaj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/935,088

(22) Filed: Nov. 1, 2024

(65) Prior Publication Data

US 2025/0062975 A1 Feb. 20, 2025

Related U.S. Application Data

(63) Continuation of application No. 18/205,815, filed on Jun. 5, 2023, now Pat. No. 12,137,041, which is a
(Continued)

(30) Foreign Application Priority Data

Sep. 29, 2014 (IN) ............................ 4862/CHE/2014

(51) Int. Cl.
*H04L 43/04* (2022.01)
*H04L 41/046* (2022.01)
(Continued)

(52) U.S. Cl.
CPC ............ *H04L 43/04* (2013.01); *H04L 41/046* (2013.01); *H04L 41/145* (2013.01); *H04L 67/10* (2013.01); *H04L 41/0803* (2013.01)

(58) Field of Classification Search
CPC ..... H04L 43/04; H04L 41/046; H04L 41/145; H04L 67/10; H04L 41/0803; H04L 41/14; H04L 12/26; H04L 29/08
See application file for complete search history.

(56) References Cited

U.S. PATENT DOCUMENTS 5,781,703 A 7/1998 Desai et al.
7,984,043 B1 7/2011 Waas
(Continued)

FOREIGN PATENT DOCUMENTS

CA 2444834 A1 4/2005
CN 101176305 A 5/2008
(Continued)

OTHER PUBLICATIONS

Clemm, "Network Analytics Task Interactions Framework", IP.com Journal, IP.com Inc., West Henrietta, NY, US, Feb. 20, 2015 (Feb. 20, 2015)< XP013166591, pp. 1-8.
(Continued)

*Primary Examiner* — Tonia L Dollinger
*Assistant Examiner* — Mehulkumar J Shah
(74) *Attorney, Agent, or Firm* — Lee & Hayes, P.C.

(57) ABSTRACT

A network analytics controller is established in a network. The network includes a plurality of nodes. A plurality of network analytics agents is established; each agent at a node of the network. Network analytics configuration parameters, including a network analytics scope, are received at the networks analytics controller. A task is assigned to each agent at a node determined to be within the network analytics scope, the task comprising that portion of the network
(Continued)

analytics specified in the network analytics configuration parameters relevant to the corresponding node. The assigned task is performed at each agent assigned a task. The networks analytics controller receives the results of each performed task, and aggregates the received results.

19 Claims, 4 Drawing Sheets

Related U.S. Application Data continuation of application No. 14/550,885, filed on Nov. 21, 2014, now Pat. No. 11,695,657.

(51) Int. Cl.
*H04L 41/0803* (2022.01)
*H04L 41/14* (2022.01)
*H04L 67/10* (2022.01)

(56) References Cited

U.S. PATENT DOCUMENTS

| | | | |
|---|---|---|---|
| 8,117,175 B1 | 2/2012 | Johnson et al. | |
| 8,185,619 B1 | 5/2012 | Maiocco et al. | |
| 8,595,357 B2 | 11/2013 | Biswas et al. | |
| 9,397,946 B1 | 7/2016 | Yadav | |
| 9,559,896 B2 | 1/2017 | Patwardhan et al. | |
| 11,695,657 B2 | 7/2023 | Clemm et al. | |
| 2002/0032769 A1 | 3/2002 | Barkai et al. | |
| 2003/0110252 A1 | 6/2003 | Yang-Huffman | |
| 2003/0142666 A1 | 7/2003 | Bonney et al. | |
| 2003/0229688 A1 | 12/2003 | Liang | |
| 2006/0074946 A1 | 4/2006 | Pham | |
| 2011/0138154 A1* | 6/2011 | Tevis | G06F 3/0632 712/E9.016 |
| 2011/0195701 A1* | 8/2011 | Cook | G01S 5/0018 455/422.1 |
| 2011/0246816 A1* | 10/2011 | Hsieh | H04L 41/12 714/4.12 |
| 2011/0273304 A1 | 11/2011 | Pryor et al. | |
| 2011/0300848 A1 | 12/2011 | Boudreau et al. | |
| 2011/0302164 A1 | 12/2011 | Krishnamurthy et al. | |
| 2012/0023498 A1 | 1/2012 | Sundararaman et al. | |
| 2012/0179809 A1 | 7/2012 | Barsness et al. | |
| 2012/0297393 A1 | 11/2012 | Zhao | |
| 2013/0163438 A1 | 6/2013 | Wilkinson | |
| 2013/0275569 A1 | 10/2013 | Calo et al. | |
| 2013/0290520 A1 | 10/2013 | Noo et al. | |
| 2014/0047107 A1 | 2/2014 | Maturana et al. | |
| 2014/0101308 A1* | 4/2014 | Wanser | H04L 43/04 709/224 |
| 2014/0189130 A1 | 7/2014 | Khandelwal et al. | |
| 2014/0189776 A1* | 7/2014 | Diehl | H04L 41/145 726/1 |
| 2014/0247149 A1* | 9/2014 | Proud | H02J 50/20 340/870.02 |
| 2014/0280338 A1 | 9/2014 | Metz et al. | |
| 2014/0324862 A1 | 10/2014 | Bingham et al. | |
| 2015/0081857 A1* | 3/2015 | Billore | H04L 41/046 709/221 |
| 2015/0089054 A1 | 3/2015 | Rizzi et al. | |
| 2015/0149613 A1 | 5/2015 | Kakadia et al. | |
| 2015/0254150 A1 | 9/2015 | Gordon et al. | |
| 2016/0182982 A1 | 6/2016 | Schmidtke et al. | |
| 2016/0197799 A1 | 7/2016 | Clemm et al. | |
| 2016/0255095 A1* | 9/2016 | Maes | H04L 41/12 726/1 |
| 2017/0060869 A1 | 3/2017 | Kelley et al. | |
| 2023/0318945 A1 | 10/2023 | Clemm | |

FOREIGN PATENT DOCUMENTS

| | | |
|---|---|---|
| CN | 101371245 A | 2/2009 |
| CN | 103618644 A | 3/2014 |
| WO | WO2016053499 A1 | 4/2016 |
| WO | WO2016111780 A1 | 7/2016 |

OTHER PUBLICATIONS

Clemm, et al., "DNA: An SDN Framework for Distributed Network Analytics", 2015 IFIP/IEEE International Symposium on Integrated Network Management (IM), May 11, 2015 (May 11, 2015)), pp. 9-17.

Dean, et al., "MapReduce: Simplified Data Processing on Large Clusters", Proceedings of the 6th Symposium on Operating Systems Design and Implementation, Dec. 6-8, 2004, San Francisco, CA, Dec. 6, 2004, 1-13.

EP Examination Report for EP application No. 15817002.7, mailed Oct. 5, 2018 (CSCO-0215EP 994695-EP.01) 10 pages.

Wittmann-Regis, "International Preliminary Report on Patentability issued in Interational Application No. PCT/US2015/046426, (CSCO-0205WP CPOL993259-WO.01)", mailed Apr. 4, 2017, 9 pages.

Wittmann-Regis, "International Preliminary Report on Patentability issued in International Application No. PCT/US2015/063748, (CSCO-0215WP CPOL 994695-WO.01)", issued Jul. 11, 2017, 8 pages.

Camba, "International Search Report and Written Opinion issued in International Application No. PCT/US2015/046426, (CSCO-0205Wp CPOL 993259)", Nov. 13, 2015, 1-13.

Baumann, "International Search Report and Written Opinion issued in International Application No. PCT/US2015/063748, (CSCO-0215WP CPOL 994695-WO.01)", Mar. 18, 2016, pp. 1-14.

Jeswani, et al., "Adaptive Monitoring: Application of Probing to Adapt Passive Monitoring", Plenum Publishing Co, US, vol. 23, No. 4, Sep. 12, 2014 (Sep. 12, 2014), XP035533351 pp. 950-977.

Office Action for U.S. Appl. No. 14/550,885 mailed on Oct. 29, 2018, Ludwig Alexander Clemm, "Network Embedded Framework for Distributed Network Analytics", 16 pages.

Office Action for U.S. Appl. No. 14/550,885 mailed on Nov. 23, 2020, Ludwig Alexander Clemm, "Network Embedded Framework for Distributed Network Analytics", 19 pages.

Office Action for U.S. Appl. No. 14/550,885 mailed Dec. 11, 2019, Ludwig Alexander Clemm, "Network Embedded Framework for Distributed Network Analytics", 19 pages.

Mahmud, "Office Action issued in U.S. Appl. No. 14/589,953, filed Jan. 5, 2015, CSCO-0215 (CPOL 994695-US.01)", mailed Feb. 1, 2018, 13 pages.

Mahmud, "Office Action issued in U.S. Appl. No. 14/859,953, filed Jan. 5, 2015, CSCO-0215 (CPOL 994695-US.01)", mailed Mar. 16, 2017, 11 pages.

Office Action for U.S. Appl. No. 14/550,885 mailed on May 25, 2017, Ludwig Alexander Clemm, "Network Embedded Framework for Distributed Network Analytics", 29 pages.

Mahmud, "Final Office Action issued in U.S. Appl. No. 14/589,953, filed Jan. 5, 2015, CSCO-0215 (CPOL 994695-US.01)", mailed Aug. 15, 2017, 11 pages.

Office Action for U.S. Appl. No. 14/550,885 mailed on Sep. 21, 2016, Ludwig Alexander Clemm, "Network Embedded Framework for Distributed Network Analytics", 15 pages.

Mahmud, "Final Office Action in U.S. Appl. No. 14/589,953 (CSCO-0215 CPOL 994695-US.01)" mailed Sep. 4, 2018, 15 pages.

"First Office Action and Search Resport issued in Chinese Application No. CN201580072330.4 filed Dec. 3, 2015", 8 pages.

* cited by examiner ment and deployment aspects associated with running distributed analytics applications across the network. Further, embodiments of the technology can dynamically adapt the type of data that is collected (for example, by altering the analytics from the controller as part of a feedback loop, or by virtue of the query itself which may require some data only when matches of other data are found).

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

As depicted in FIG. 1, the architecture 100 includes network computing devices 110, 120, 130, and 140, each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

The network connections illustrated are example and other means of establishing a communications link between the computers and devices can be used. Moreover, those having ordinary skill in the art having the benefit of this disclosure will appreciate that the network devices illustrated in FIG. 1 may have any of several other suitable computer system configurations. For example, network 110 can be embodied as a mobile phone or handheld computer and may not include all the components described above.

In example embodiments, the network computing devices and any other computing machines associated with the technology presented herein may be any type of computing machine such as, but not limited to, those discussed in more detail with respect to FIG. 4. Furthermore, any modules associated with any of these computing machines, such as modules described herein or any other modules (scripts, web content, software, firmware, or hardware) associated with

NETWORK EMBEDDED FRAMEWORK FOR DISTRIBUTED NETWORK ANALYTICS

CROSS-REFERENCE TO RELATED APPLICATIONS

This application claims priority to and is a continuation of U.S. patent application Ser. No. 18/205,815, filed on Jun. 5, 2023, entitled "Network Embedded Framework for Distributed Network Analytics," which claims priority to and is a continuation of U.S. patent application Ser. No. 14/550,885, filed on Nov. 21, 2014, entitled "Network Embedded Framework for Distributed Network Analytics," which claims the benefit of Indian Patent Application Number 4862/CHE/2014, filed Sep. 29, 2014, entitled "A Network Embedded Framework for Distributed Analytics," the complete disclosure of which is hereby fully incorporated herein by reference.

TECHNICAL FIELD

The disclosed technology relates to network analytics in core routing and switching, networking environments, and Local Area Networks (LAN).

DETAILED DESCRIPTION OF EXAMPLE EMBODIMENTS

Overview

Figure 1:
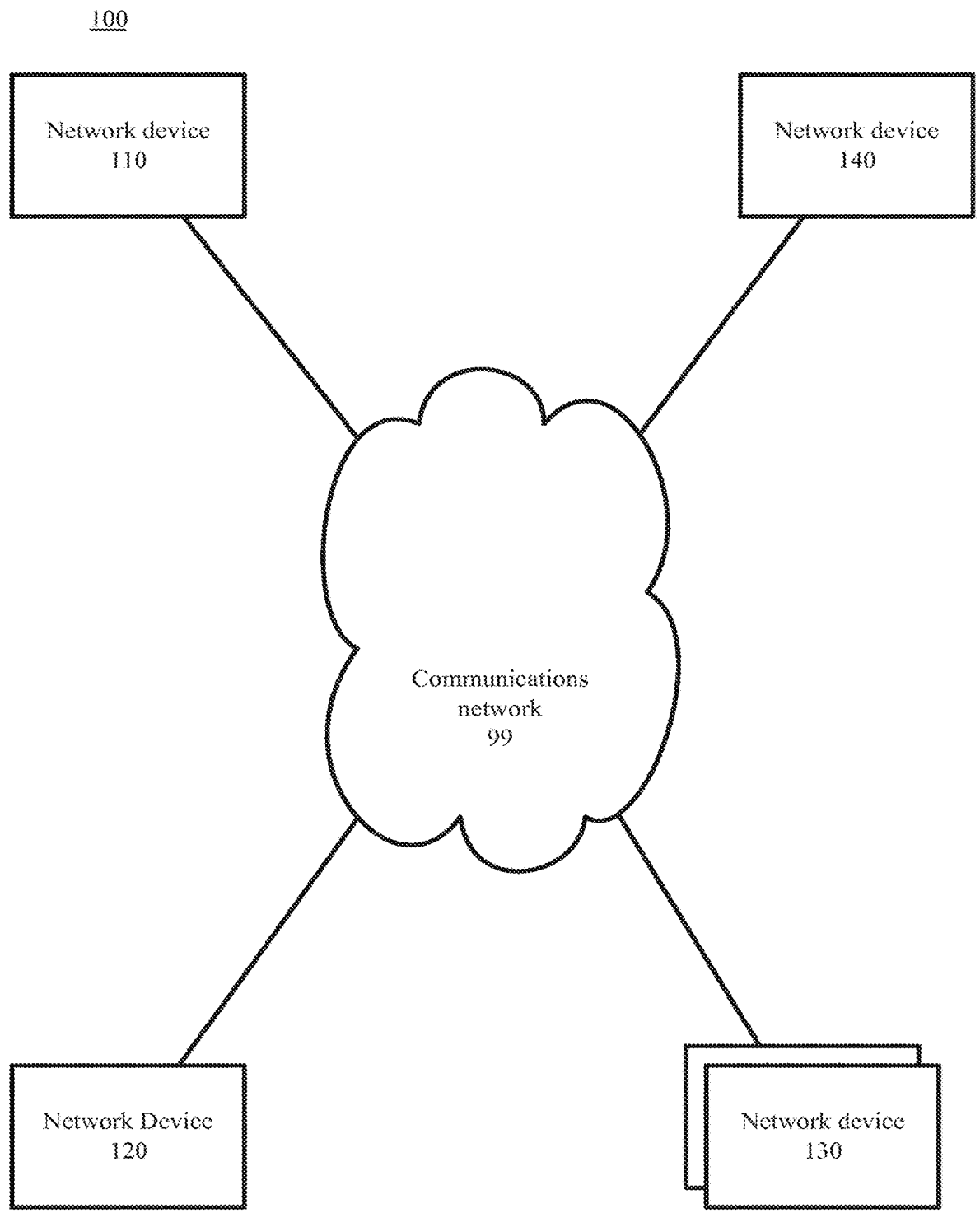
FIG. 1 is a block diagram depicting a communications and processing architecture in accordance with certain example embodiments of the disclosed technology.

Embodiments of the disclosed technology include a distributed cross network analytics framework that can be used to program and deploy aggregation algorithms at network nodes, and to configure/setup data sources to generate the data that is needed for, and subjected to, those analytics. Such an approach adds intelligent functionality to the network nodes that provides visibility into the real time network state and reduces the need for centralized collection of network telemetry data.

The disclosed embodiments use the framework to distribute analysis of network measurements. The framework can take advantage of the distributed nature of the sources of network telemetry data and of the availability of processing capacity on the same nodes. Thus, it can eliminate the step of first collecting the data centrally and then mapping the data back out to distributed nodes for processing. Some advantages of this approach include better scalability of applications, substantial reduction of, if not elimination of, the need for expensive collection infrastructure, reduction of networking overhead (for example, repeated transmission of data), and the ability to process data closer to real time. Additional intelligence can be added to the network device, for example, the router, instead of the network management stations. The framework can handle the systems managethe technology presented herein may by any of the modules discussed in more detail with respect to FIG. 4. The computing machines discussed herein may communicate with one another as well as other computer machines or communication systems over one or more networks, such as network 99. The network 99 may include any type of data or communications network, including any of the network technology discussed with respect to FIG. 4.

Example Embodiments

The example embodiments are described hereinafter with respect to the components of the example operating environment and example architecture described elsewhere herein. The example embodiments may also be practiced with other systems and in other environments.

The present-day approach to analytics involves the collection of large volumes of data from edge devices and raw data being exported to a central location, such as a data center, where the data is subsequently subjected to big data algorithms using frameworks (such as Hadoop, MapReduce), which are able to crunch through vast amounts of data, typically involving parallelizing processing across different processors.

In the context of network analytics, a similar approach involves having network nodes generate large volumes of telemetry data, such as Simple Network Management Protocol (SNMP) statistics, flow records, Syslog, and Internet Protocol Service Level Agreement (IPSLA) statistics, collecting this data from the network, exporting the data and storing it in a central repository, and then subjecting the data to big data algorithms and analytics applications.

As effective as this approach is in analyzing data after that data has been collected, significant limitations and downsides can be associated with it. Such downsides include the fact that the approach does not take other parts of the analytics lifecycle and the specifics of the networking context into account. For example, significant overhead may be involved (CPU, memory, bandwidth, storage) to generate the data, to export it from the device, and finally collect and store it. Worse, a large percentage of raw data that is collected ends up not being used, making this approach inefficient. Also, there may be limitations in the amount of data that can be generated at or transferred from a given node. Some existing approaches are susceptible to bottlenecks where devices are connected over slow and/or expensive WAN links. The bandwidth to transmit data is thus limited or not cost-effective, thereby limiting the amount of raw data that could be analyzed centrally. Waste is not only a problem for the network, but for the analytics application as well. Northbound users and applications typically need to deal with devices individually, having to discover them and manage/configure them one-by-one.

Embodiments of the present technology include a programmable approach to network analytics by which the analytics task is distributed to network nodes, can be used to configure the data source, and involves the scheduling of the analytics task. Such an approach can take advantage of the distributed nature of network telemetry data, delegating much of the processing of data at, or close to, the data source to minimize data generation, and significantly reduce the data transfer, and collection overhead. Embodiments of the present technology can allow users to interact with the network as one entity and dynamically adjust network analytics tasks without needing to deal with individual network elements one at a time.

Embodiments of the present technology include a network embedded, distributed framework for the processing of network telemetry data.

The framework comprises:
1. A Network Analytics Service, allowing users to conduct network analytics that is distributed across the network in a holistic fashion, using network level abstractions provided through a single point of interaction.
2. A set of Analytics Agents that are embedded within network devices. The agents can be configured and dynamically programmed using a concept referred to as "maplets," defining analytics tasks that are conducted at the device level. A maplet specifies the network telemetry data to be analyzed and the aggregation and query logic to be applied. The Analytic Agent includes logic to convert data into a data stream, to analyze the data and the stream, and to export the results. In addition, the Analytics Agent provides autonomic functions to deal with proper cleanup and avoid orphaned analytics tasks. The agent logic can also include the configuration and setup of the underlying data source to generate the data of the data stream. In some cases this includes considerable logic (e.g., for DCM or IPSLA). For example, to generate a stream of measurements data, probes can be configured that generate the test traffic and compute current service levels. To generate a stream of SNMP data, internal pollers can be set up that keep collecting the needed data snapshots.
3. A Network Analytics Controller provides the Network Analytics Service, and includes the associated logic to orchestrate the deployment of maplets across the network, to monitor the state of the Network Analytics Task and give a sense of any degradation of such task, to consolidate results reported from network devices and to potentially process them further using "reducelets," which are analytics tasks that collate data received from multiple devices.

Figure 2:
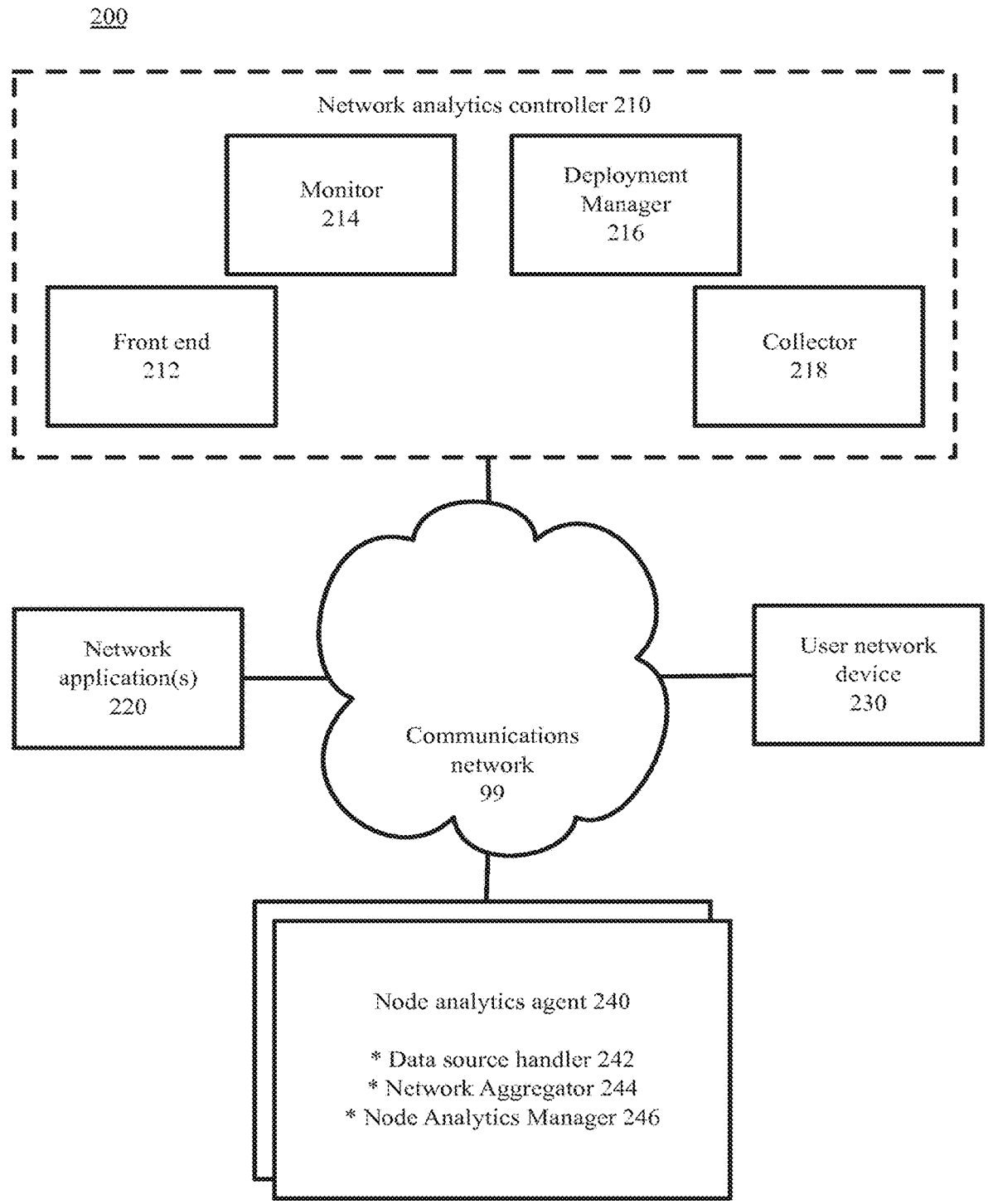
FIG. 2 is a block diagram depicting an architecture in accordance with certain example embodiments of the disclosed technology.

Referring to FIG. 2, an example framework 200, in accordance with the disclosed technology, comprises the following components:
(1) A Network Analytics Controller 210, providing a Network Analytics Service. The Network Analytics Controller comprises the following components: A) A Front end 212, which exposes an interface that allows users 230 and northbound applications 220 to configure the basic parameters (data source, schedule, analytics functions to be performed) for distributed analytics processing. B) A Network Analytics Monitor 214, which provides a monitoring function that keeps track of which nodes participate in a given analytics function, the health status of analytics tasks, and statistics about the task, among other items. Users can retrieve this information, or be notified as appropriate, to get a sense of the level of degradation of the task (in case of nodes in the network with degraded capabilities, inability to support the requested query, etc.). C) A Network Analytics Deployment Manager 216, which determines the network analytics tasks to be performed by node analytics agents in the network, generates the corresponding maplet, deploys those maplets across the network, and resolves where to deploy the network analytics tasks, and how to deal with the impact of network changes (for example, when a new device joins the network, deploying a task that is already ongoing in the network for other devices). D) A Network Analytics Results Collector 218, which collects the results. The Network Analytics Results Collector 218 can furthermore collate those results for cross network analytics. For this purpose, results are fed as a data stream into an instance of a stream processing engine that also runs at a controller. The processing to be conducted is specified as part of a "reducelet" that defines the fields of the data stream and the query and aggregations to be applied. In a specific instance, the Network Analytics Controller 210 is implemented on top of a Software Defined Network (SDN) Controller Framework, such as Open Daylight. A YANG Data Model is defined to describe Network Analytics Tasks that can be configured by users. A Network Analytics Task includes a network scope (indicating across which part of the network a task is to be applied), a task maplet (indicating the data sources for the task, and the query and aggregation to be applied against the data), and a schedule. Using this YANG Data Model, similar to a REpresentational State Transfer (REST) API (based on RESTconf) is generated that is exposed by the controller to end users. Using this YANG data model, YANG-based interfaces can be generated and supported, for example ReST-like APIs, in addition to Netconf.

(2) A Node Analytics Agent 240, deployed at nodes/data sources to be analyzed. This includes: A) A Data Source handler 242, which configures telemetry data sources as needed to generate the data that needs to be aggregated and configures IPSLA for service level monitoring. In a specific instance, these data sources include DCM, a data collection feature supported on Cisco devices, providing streamed MIB data, as well as NetFlow and corresponding Information Elements. B) A Network Aggregator 244, which executes the query and aggregation function logic that preprocesses raw data and forwards the aggregated data to the Network Analytics Service. A specific instance is continuous queries, such as used in Cisco's Continuous Query Engine (CQE). C) A Node Analytics Manager 246, responsible for communicating with the Network Analytics Controller 210: discovery, registration, and deployment of aggregation analytics tasks; Conducting analytics admission functions (deciding whether to accept or decline task requests based on current load conditions), and systems management functions (including automatic release of resources after conclusion of the task, or when a task is not refreshed.)

The framework 200 can include a component to process reducelets, for example, analytics tasks that correlate/aggregate results returned from multiple DNA agents.

The following example termed "where is my IP traffic" illustrates how the present technology can be applied to analysis of network telemetry data. A user wants to determine which nodes in a network are traversed by traffic that originates from or is destined towards a particular place in the network, e.g., a particular IP address, or subnet. (An alternative query might look for traffic of a certain type, e.g., "where is my Netflix traffic".)

Using Distributed Network Analytics, a user requests to deploy an analytics query that turns on aggregated NetFlow across the network for a very brief time frame with very brief flow expiration timers. Nodes that see traffic matching the criteria report corresponding flow records back to the controller, where they are aggregated and presented to the user, where they can be analyzed further. The user issued a single request and did not need to determine which nodes to configure in what ways. The network needed to generate data only for a brief period of time, and exported only those flow records that were really needed.

Figure 3:
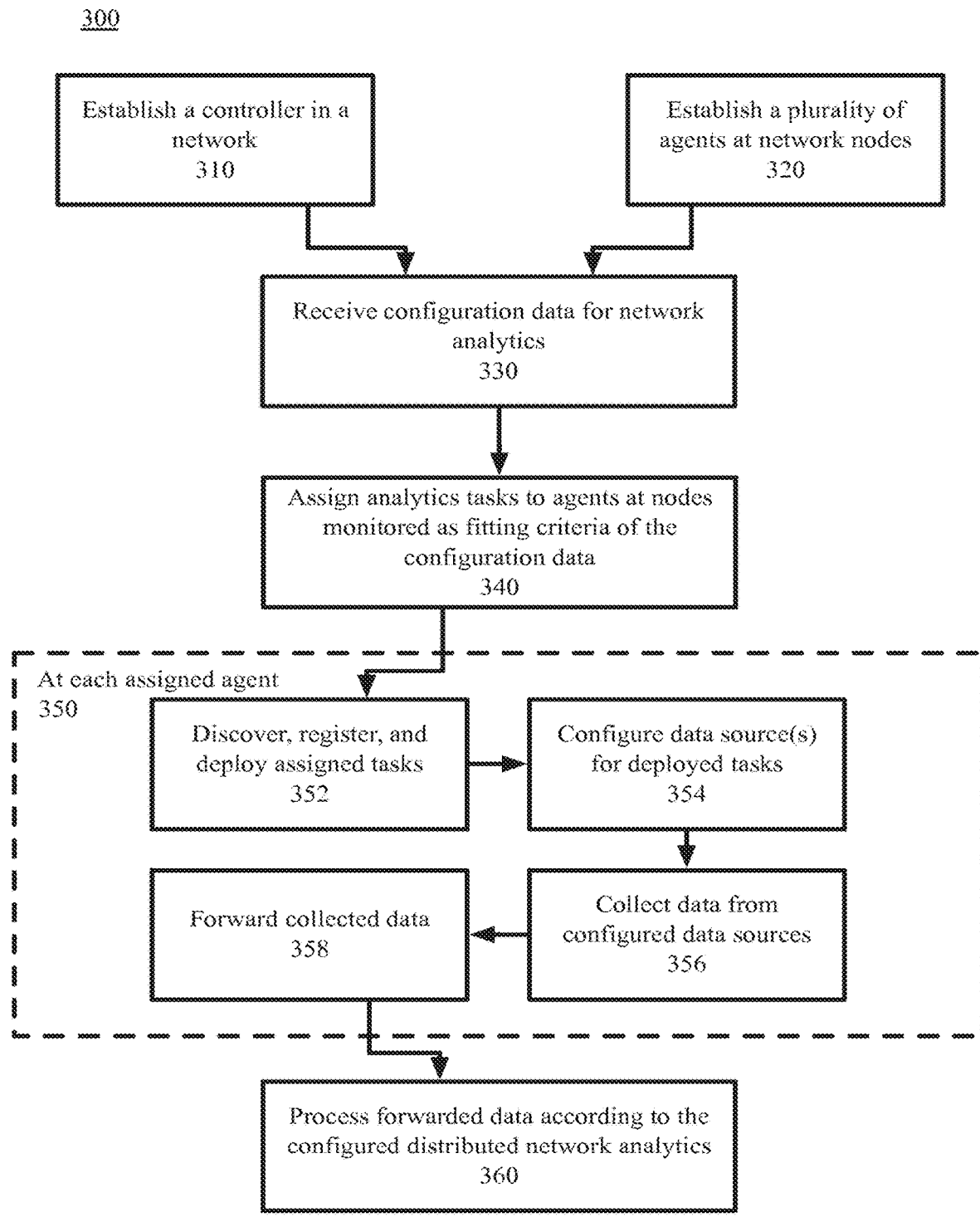
FIG. 3 is a block diagram depicting a method in accordance with certain example embodiments of the disclosed technology.

Referring to FIG. 3, an example embodiment of a method 300 in accordance with the disclosed technology is illustrated. In such methods a controller is established in a network—Block 310. The controller includes: a front end operative to expose an interface over the network allowing a user to configure distributed analytics, a monitor operative to monitor network nodes that participate in distributed analytics, a deployment manager operative to assign one or more tasks to an agent at each network node participating in the configured distributed analytics, and a collector operative to collect results from tasked agents and processing the results according to the configured distributed analytics.

A plurality of agents are established—Block 320. Each agent is deployed at a node of the network in communication with the controller. Each agent includes: a node manager operative to communicate with the controller to discover, register, and deploy tasks assigned to the agent; a data source handler operative to configure data sources at the node to collect data called for by the deployed tasks; and a network aggregator operative to preprocess and forward collected data to the controller.

Configuration data for network analytics is received in the controller via the front end—Block 330. Network analytic tasks are assigned in the controller to each network node monitored as fitting criteria of the configuration data, via the deployment manager—Block 340.

For each network node fitting criteria of the configuration data the tasks assigned to an agent deployed at the node are discovered, registered, and deployed within the node—Block 352. At least one data source is configured, by a data source handler of the agent at the node, to collect data called for by the deployed task—Block 354. Data is collected, by the data source handler of the agent at the node, from each source as configured—Block 356. The collected data is forwarded to the controller by an aggregator of the agent at the node—Block 358. The forwarded data is processed at the collector according to the configuration of the distributed analytics—Block 360.

Embodiments of the technology also include a Network Scope Service. Today, applications can interact with SDN controllers that provide higher layer functionality that can hide and abstract underlying devices entirely, such as in setting up a path through a network. However, in many cases applications still need access to individual device functions, for example, in order to set up a local analytics task on a device, to set up thresholds for proactive monitoring, or to configure subscriptions to syslog messages. In such cases, applications need to interact with devices individually, even if such interaction occurs through an SDN controller, and even if the same type of device function needs to be accessed and/or configured across multiple devices at the same time.

Embodiments of the technology disclosed herein include embodiments by which applications that sit on top of an SDN controller interact with user-defined subsets of network devices as a whole, even for individual device functions, instead of one at a time.

The Network Scope Service allows operations to be applied against a network scope, for example, devices specified by network scope policy, respectively against the network scope set, rather than having operations directed at devices individually. In some embodiments, "scope" extends to topological concepts, such as membership in a vicinity or in a "network neighborhood", or on a path. Scope policy includes the rule(s) by which membership of a device in the scope is determined. "Set" includes the set of devices that fulfill the policy.

In some embodiments, network scope can be implemented as an ordered list of scope policy rules. The technology includes a framework that allows operations against the network scope set as a whole and that tracks the status of those operations. The technology further includes facilities to deal with dynamic changes in scope membership due to underlying changes in the network. Some embodiments apply specifically to the context of SDN controllers.

The Network Scope Service can allow operations to be specified against sets of devices determined by policy, as opposed to individual devices one at a time. Some embodiments provide easy administration using ordered lists of simple rules. Some embodiments allow network scope to be defined by Boolean expressions. The technology can be useful across a wide range of SDN applications, distributed analytics, and network event services, for example.

In some embodiments, the Network Scope Service is invoked by a network controller, and allows users and applications to specify a network scope policy, in order to determine which devices fall within a given network scope. The input to the Network Scope Service is a scope policy. The service can return a set of nodes that fall within that scope, termed a network scope set.

In some embodiments, the scope policy includes multiple criteria that determine whether or not a device is included in a scope. These criteria can include device name/address (including wild-carded and enumerated lists of device names/addresses; and address ranges); device properties (static device property, such as equipment type, software/image version; labels administratively assigned to the device; PIN (Place In the Network); and dynamic context or dynamic property, such as a health status, e.g., above/below a certain threshold); and topological properties (e.g., neighbors of a device; devices within a certain distance of another device, or devices that fall into another scope policy; and devices along a route or path (from/to/via)).

In some embodiments, the technology includes a definition of individual scope policy rules. Each scope policy rule lists a condition, and a resolution whether to include or exclude devices from the scope set that meet the condition—either "include" or "exclude" can be the default. In some embodiments, a scope policy comprises an ordered list of scope policy rules. The first rule that matches a given device is applied. If no rule matches, a default (include or exclude) is applied by implicitly appending a rule "match all".

Each Network Scope Policy can have an identity, and can be referred to by name. This allows for reuse of a previously specified scope policy consistently in multiple contexts, for example, as a target for different operations at different points in time. The Network Scope Service resolves scope by network inventory and topology information.

In some embodiments, the Network Scope Service allows users and applications to direct an operation at a network scope, associating the operation with the network scope set. The Network Scope Service applies the operation against the network scope set with the set of devices that fall within the scope at a given point in time. In other words, the service will direct the corresponding operation request at every device that falls within that scope. In some embodiments, the Network Scope Service allows for update of the network scope set as the underlying network incurs changes. Updates can occur on request, or periodically, or triggered by network inventory and topology changes that cause the changed devices to be reassessed against the network scope policy. Changes to the network scope set are noted accordingly and operations directed at the scope set can be reapplied as needed.

The Network Scope Service can be implemented in an SDN Controller, which is responsible for resolving scope policies. Specifically, the Network Scope Service can be built as an extension on top of a topology service.

One use case for the Network Scope Service is distributed network analytics; in which network analytics are to be applied against a certain scope of the network (for example, all 2850 switches, or routers with IOS XR 5.2.1 no further than 3 hops removed from devices in a certain subnet). Another use case includes network event services, in which event subscriptions can be managed and differentiated by membership in a network scope.

Other Example Embodiments

Figure 4:
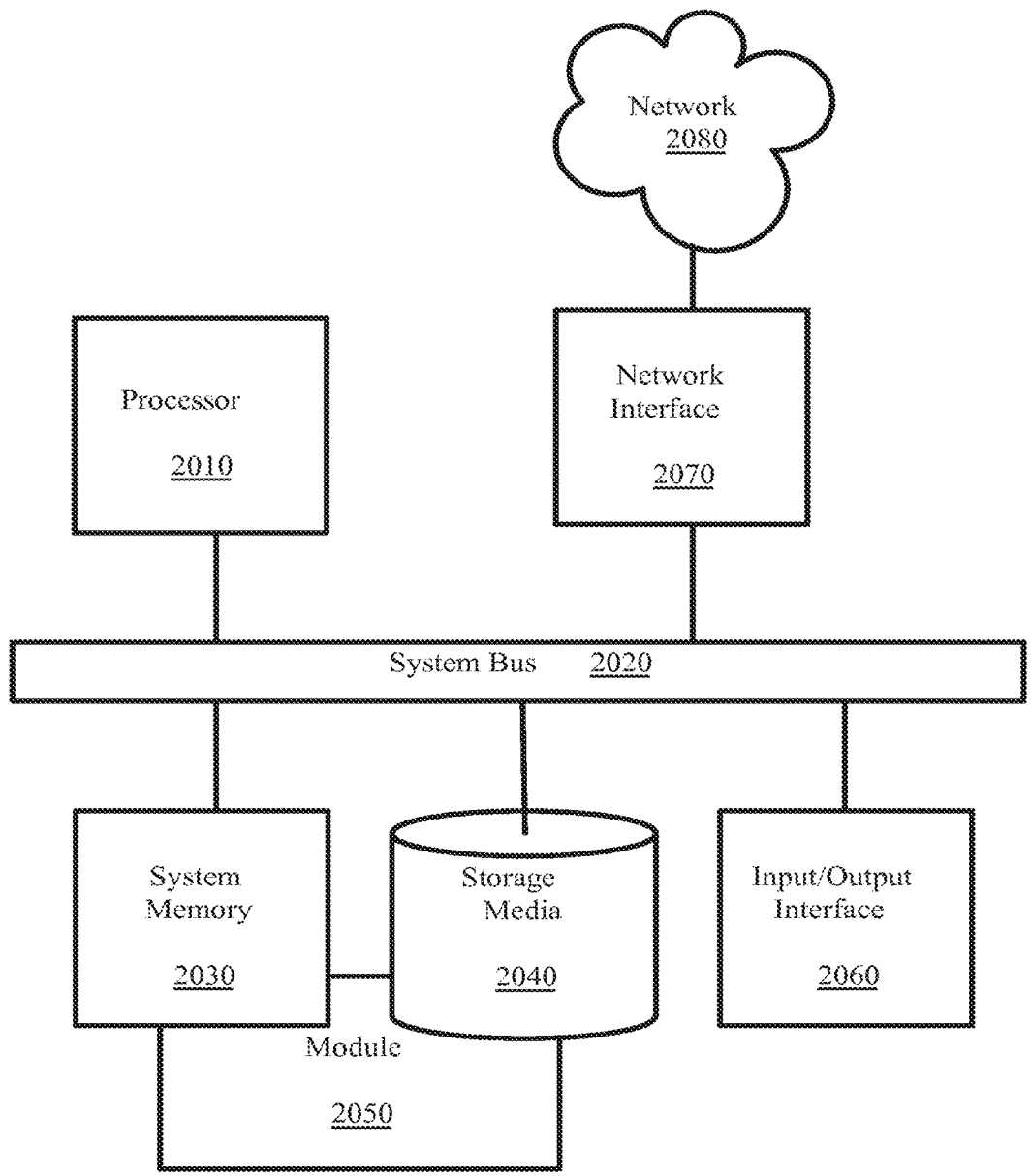
FIG. 4 is a diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method comprising:
configuring a network analytics agent within a first network via a communications network between the network analytics agent and a network analytics controller;
receiving first telemetry data at the network analytics agent, and at least partially processing the first telemetry data at the network analytics agent to create first at least partially processed data, wherein the first at least partially processed data is created at least partly from applying a first analytics function to the first telemetry data;
forwarding the first at least partially processed data to the network analytics controller, the first at least partially processed data having a first scope;
adjusting the configuration of the network analytics agent in response to a dynamic change in observations associated with the network; and
receiving second telemetry data at the network analytics agent, and at least partially processing the second telemetry data at the network analytics agent to create second at least partially processed data, wherein the second at least partially processed data is created at least partly from applying a second analytics function to the second telemetry data; and
forwarding the second at least partially processed data to the network analytics controller, wherein the second at least partially processed data has a second scope due to a difference between the first analytics function and the second analytics function.

2. The method of claim 1, further comprising again performing the configuring, receiving, forwarding, adjusting, receiving, and forwarding operations relative to a plurality of network analytics agents.

3. The method of claim 2, wherein the network analytics controller comprises a collector to receive and collate the first telemetry data and the second telemetry data from a plurality of network analytics agents.

4. The method of claim 2, wherein the network analytics controller comprises a user interface allowing users to configure parameters for the plurality of network analytics agents.

5. The method of claim 2, wherein the network analytics controller comprises a user interface allowing users to view collated results from the plurality of network analytics agents.

6. The method of claim 1, wherein the dynamic change in the observations associated with the network is detected in the first at least partially processed data received by the network analytics controller.

7. The method of claim 1, wherein the dynamic change in the observations associated with the network is related to a health status of one or more nodes on the network.

8. A system comprising:
a plurality of network-connected nodes, each node including a processor, a memory, and a network interface;
wherein a first node is designated as a network analytics controller, and at least two nodes are designated as network analytics agents;
further including a set of instructions which, when interpreted by the processors within the system, cause the system to perform operations including:
configuring the network analytics agents by the network analytics controller; at each network analytics agent:
receiving first telemetry data at a first time, and processing a first portion of the first telemetry data at the network analytics agent using a first analytics function; and
forwarding the first portion of the first telemetry data to the network analytics controller, the first portion of the first telemetry data having a first scope;
by the network analytics controller, adjusting the configuration of the network analytics agents in response to a dynamic change in observations associated with the network;
receiving second telemetry data at a second time at the network analytics agents, and processing a second portion of the second telemetry data at the network analytics agents using a second analytics function; and
forwarding the second portion of the second telemetry data to the network analytics controller, wherein the second portion of the second telemetry data has a second scope due to a difference in the first and second analytics functions.

9. The system of claim 8, wherein the network analytics controller comprises a collector to receive and collate the first portion of the first telemetry data from a plurality of network analytics agents.

10. The system of claim 8, wherein the network analytics controller comprises a user interface allowing users to configure parameters for the plurality of network analytics agents.

11. The system of claim 8, wherein the network analytics controller comprises a user interface allowing users to view collated results from the plurality of network analytics agents.

12. The system of claim 8, wherein the dynamic change in the observations associated with the network is detected in the first portion of the first telemetry data received by the network analytics controller.

13. The system of claim 8, wherein the dynamic change in the observations associated with the network is related to a health status of one or more nodes on the network.

14. A non-transitory, non-volatile computer-readable medium comprising instructions, which when interpreted by processors within a plurality of network-connected nodes, cause the network-connected nodes to perform operations including:
configuring a plurality of nodes as network analytics agents by a node configured as a network analytics controller;
at each network analytics agent:
receiving first telemetry data at a first time, and processing a first portion of the first telemetry data at the network analytics agent using a first analytics function; and
forwarding the first portion of the first telemetry data to the network analytics controller, the first portion of the first telemetry data having a first scope;
by the network analytics controller, adjusting the configuration of the network analytics agents in response to a dynamic change in observations associated with the network;
receiving second telemetry data at a second time at the network analytics agents, and processing a second portion of the second telemetry data at the network analytics agents using a second analytics function; and
forwarding the second portion of the second telemetry data to the network analytics controller, wherein the second portion of the second telemetry data has a second scope due to a difference in the first and second analytics functions.

15. The non-transitory, non-volatile computer-readable medium of claim 14, wherein the operations performed by the network analytics controller comprise receiving and collating the first portion of the first telemetry data from a plurality of network analytics agents.

16. The non-transitory, non-volatile computer-readable medium of claim 14, wherein the operations performed by the network analytics controller comprise providing a user interface allowing users to configure parameters for the plurality of network analytics agents.

17. The non-transitory, non-volatile computer-readable medium of claim 14, wherein the operations performed by the network analytics controller comprise providing a user interface allowing users to view collated results from the plurality of network analytics agents.

18. The non-transitory, non-volatile computer-readable medium of claim 14, wherein the dynamic change in the observations associated with the network is detected in the first portion of the first telemetry data received by the network analytics controller.

19. The non-transitory, non-volatile computer-readable medium of claim 14, wherein the dynamic change in the observations associated with the network is related to a health status of one or more nodes on the network.

* * * * *